United States Patent [19]

Rendessy

[11] 3,920,266
[45] Nov. 18, 1975

[54] DUAL PURPOSE TRAILER SWAY CONTROL DEVICE AND SAFETY CONNECTOR FOR MOUNTING ON EITHER THE TOWED OR TOWING VEHICLE

[76] Inventor: William L. Rendessy, 8028 N. 14th Place, Phoenix, Ariz. 85020

[22] Filed: Aug. 20, 1974

[21] Appl. No.: 502,058

Related U.S. Application Data

[63] Continuation-in-part of Ser. No. 369,263, June 12, 1973, Pat. No. 3,871,686.

[52] U.S. Cl. ............................................ 280/446 B
[51] Int. Cl.² .......................................... B60D 1/00
[58] Field of Search ............. 280/446 R, 446 A, 457

[56] References Cited
UNITED STATES PATENTS

| | | | |
|---|---|---|---|
| 2,691,533 | 10/1954 | Koontz | 280/446 B |
| 3,362,727 | 1/1968 | Malherbe | 280/446 B |
| 3,379,456 | 4/1968 | Bogie | 280/446 B |
| 3,724,875 | 4/1973 | Hillman | 280/446 B X |

*Primary Examiner*—Leo Friaglia
*Attorney, Agent, or Firm*—Warren F. B. Lindsley

[57] ABSTRACT

A sway control device for mounting on either the towed or towing vehicle employing a flexible connector passing over a frictionally damping surface or surfaces for preventing uncontrolled lateral movements of the towed vehicle and serving the dual function of a conventional safety chain.

The flexible connector comprises preferably a tough, durable belt or cable at least equal in strength to the chain linkages normally used as safety chains and having an external surface suitable for frictional damping use. A curved or arcuate structure is used in conjunction with the flexible connector for providing the friction damping surface which is positioned to encompass the common pivotal hitch connection of a towed trailer to the towing vehicle to retain and limit vertical lateral, forward and rearward movement of the trailer coupler in event of disconnection while the trailer is being towed. Simplicity of installation, operation and interchangeability of the device for use on other trailers to be towed by the same vehicle are features of the disclosed device.

23 Claims, 18 Drawing Figures

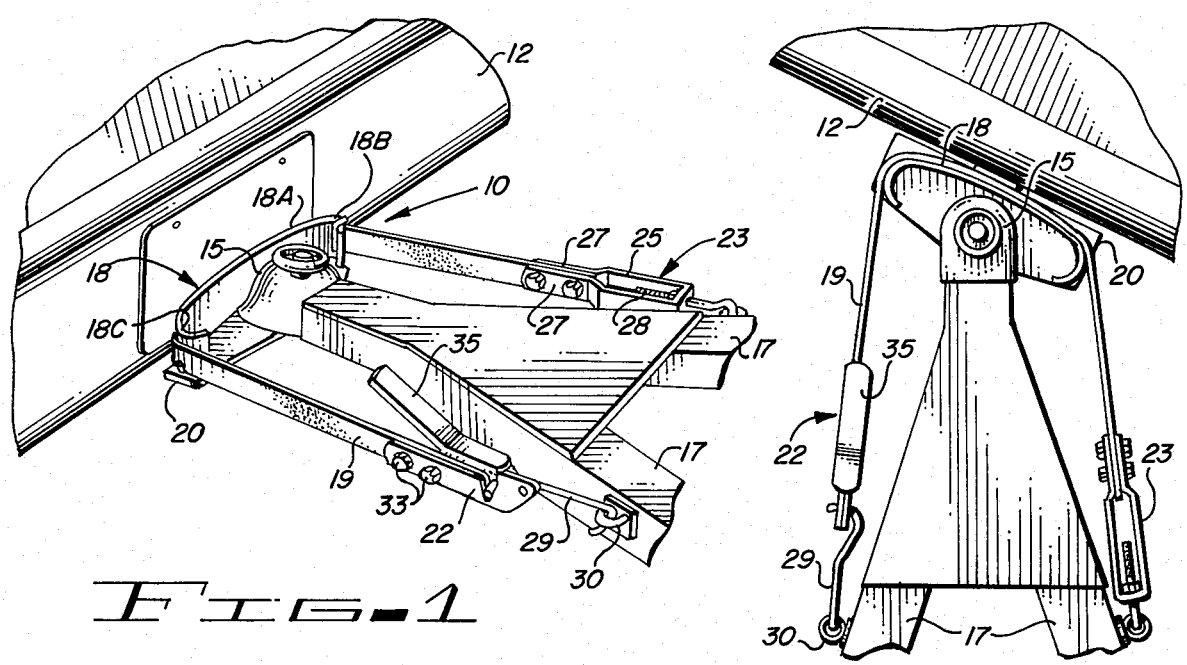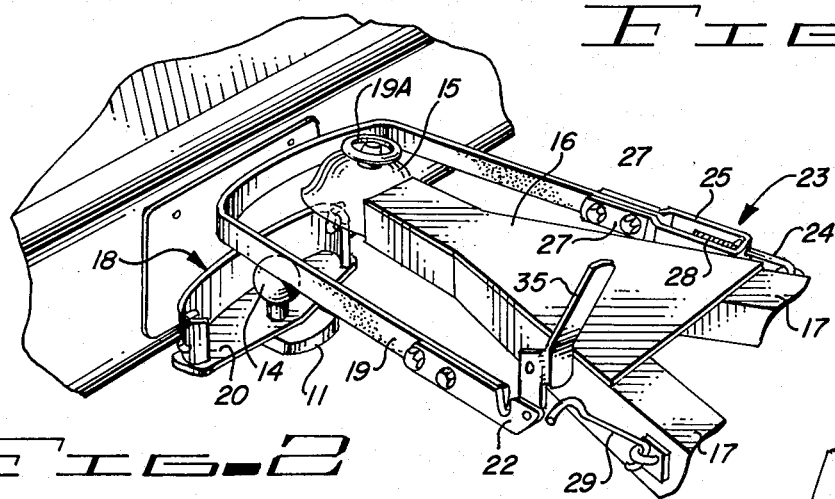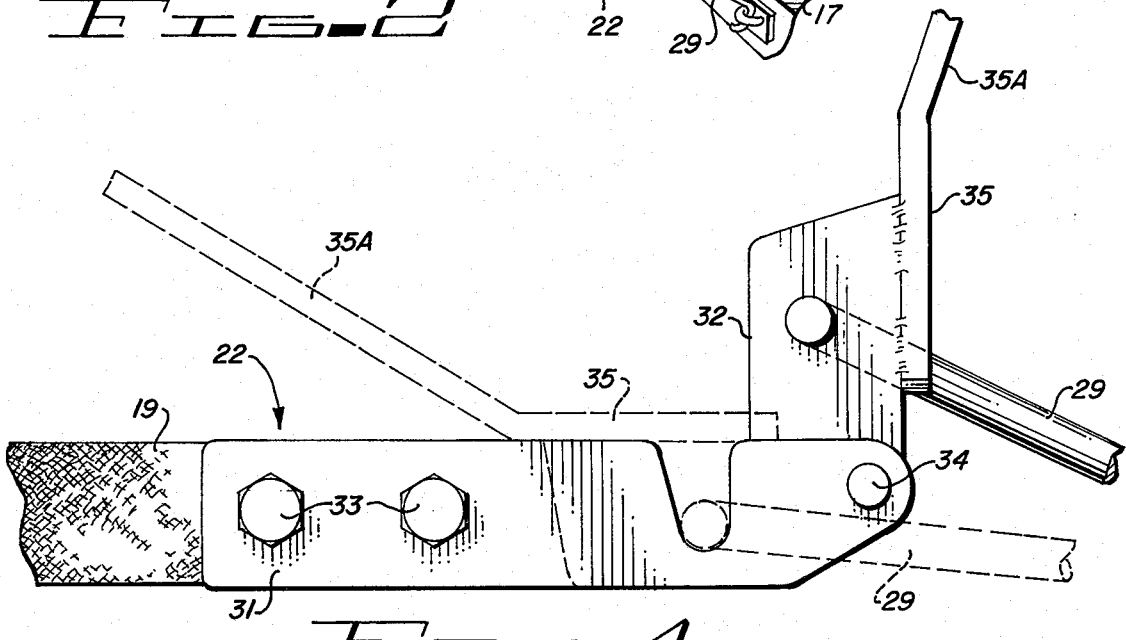

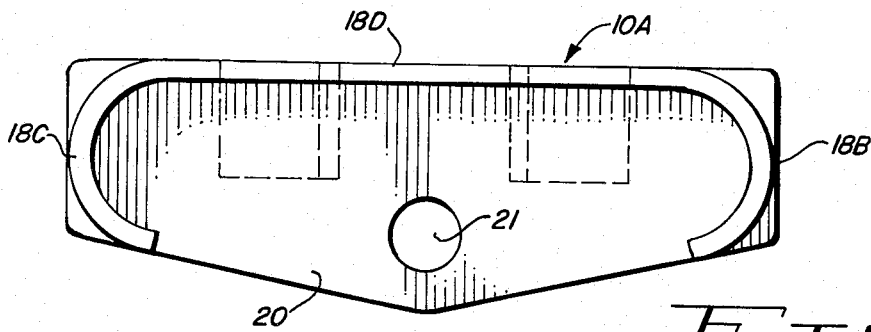
FIG-5
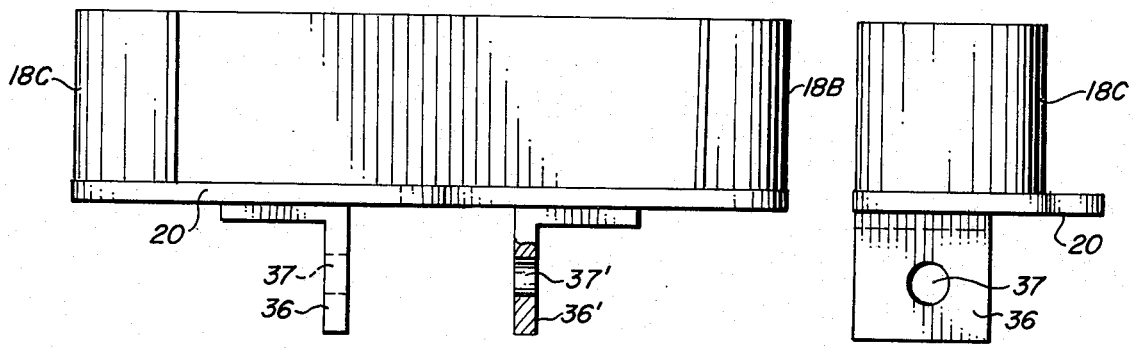
FIG-6  FIG-7
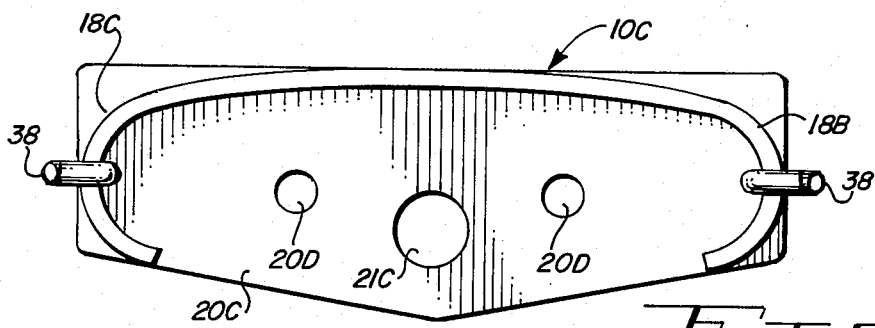
FIG-8
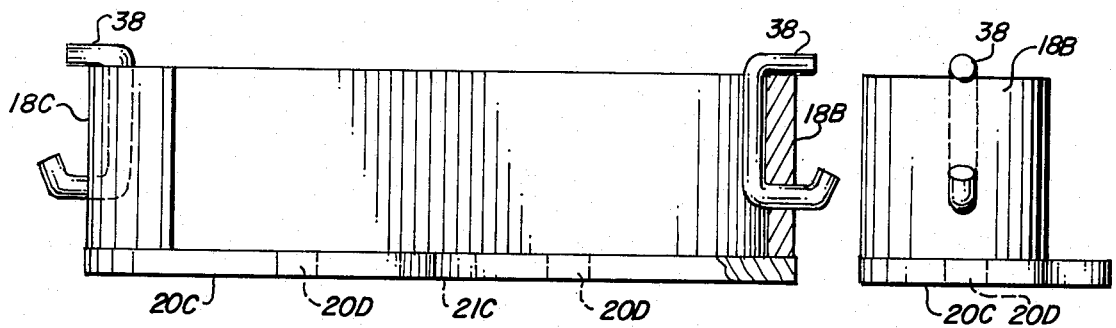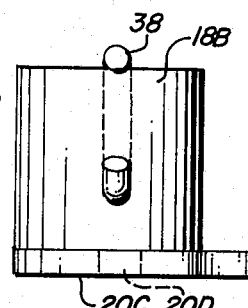
FIG-9  FIG-10

DUAL PURPOSE TRAILER SWAY CONTROL DEVICE AND SAFETY CONNECTOR FOR MOUNTING ON EITHER THE TOWED OR TOWING VEHICLE

This application is a Continuation in Part of Application, Ser. No. 369,263, filed June 12, 1973 and now U.S. Pat. No. 3,871,686, entitled TRAILER SWAY CONTROL DEVICE, by the same inventor.

BACKGROUND OF THE INVENTION

The use of towed trailers behind automobiles and lightweight trucks has become quite commonplace and the hazards associated with such vehicular combinations are well known. A particularly dangerous characteristic of the towed trailer is its tendency to sway from side to side under conditions initiated by sudden turns, cross winds, air drafts produced by passing trucks, improper loading of the trailers, among other things. Certain combination of various parameters such as the length of the trailer tongue, the weight of the load, and the surface of the highway increase the tendency for the trailer to sway and even increase the intensity or amplitude of the swaying action once it has started. Under such conditions it is difficult if not impossible for the driver of the towing vehicle to maintain control of his vehicle. The combination of the towing vehicle and the trailer in the presence of such critically related parameters contributes an unstable mechanical system.

In view of the foregoing, the required use of safety chains throughout the United States when towing even in conjunction with sway control devices is well understood. However, the value of a safety chain as a safety connector between a towing vehicle and a towed trailer is somewhat dubious in view of the number of accidents still caused by disconnection of the trailer from the towing vehicle.

Prior art disclosures have been limited in scope and have provided for devices only to lessen or prevent the swaying motion of trailers. Some of these devices are complicated in structure involving pulleys or spools, brake shoes, telescoping structure employing friction or hydraulic damping means and usually have numerous parts requiring periodic replacement otherwise the devices may become dangerous within themselves. Furthermore, some prior art devices employ only one means of connection on only one side of the longitudinal axis of the towed trailer to obtain sway control presenting a potentially dangerous condition should the trailer tongue break away from the towing vehicle when in motion.

SUMMARY OF THE INVENTION

In accordance with the invention claimed, an improved sway control device is provided having one or more fixed, curved or arcuate surfaces adapted to be mounted on the hitch bracket of a towing vehicle interconnected by flexible operating means secured to opposite sides of a trailer being towed. Adjustment means are provided to cause tension in the flexible means inducing frictional restraint of movement of the flexible means about the curved or arcuate surfaces coincident with any lateral movement of the towed vehicle.

It is, therefore, one object of this invention to provide an improved sway control device for mounting on either the towed or towing vehicle.

Another object of this invention is to provide such an improved sway control device for mounting to a hitch bracket adapted to be secured to a towing vehicle.

A further object of this invention is to provide a cross member secured to the hitch bracket of a towing vehicle to significantly increase the area of the hitch bracket and to which curved or arcuate surfaces or other suitable friction restraining constructions are fixedly secured to confine and limit movement of the trailer coupler in event of accidental disconnection of the pivotal hitch connection.

A still further object of this invention is to provide a sway control device utilizing flexible means moving over friction inducing surfaces having tensile strength equivalent to chain linkage to replace and substitute for the conventional chain safety linkages.

A still further object of this invention is to provide a sway control device that is readily secured or removed from the hitch of a towing vehicle by employing simple mounting brackets that can be permanently welded to a hitch bracket at the factory prior to installation on a towing vehicle to save installation costs.

A still further object of this invention is to provide a sway control device attached to a towing hitch bracket to avoid obstructions that may be prevalent on trailer tongues.

A still further object of this invention is to provide a dual function safety connector for a trailer sway control device that would prevent the tongue of a trailer from dropping to the road in event it accidentally became disconnected from the towing vehicle while being towed.

A still further object of this invention is to provide a sway control device mountable on a towing vehicle and connectable to a plurality of trailers.

A still further object of this invention is to provide a sway control device which required little or no maintenance or periodic adjustments.

A still further object of this invnetion is to provide a sway control device which will not readily wear out or require replacement of moving parts.

A still further object of this invention is to provide a sway control device which also serves the dual function of a safety connector between the towing vehicle and the trailer being towed.

A still further object of this invention is to provide a sway control device which is easily installed, connected and adjusted for operation.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing in which:

FIG. 1 is a perspective view showing one model or embodiment of the improved sway control device mounted on the conventional hitch bracket of a towing vehicle and connected to the tongue of a trailer.

FIG. 2 is a view similar to FIG. 1 with the sway control device in position over the hitch ball of the hitch bracket.

FIG. 3 shows a partial plan view of a sway control device similar to that shown in FIG. 1 with the towing vehicle in an annular position to the towed vehicle.

FIG. 4 is an enlarged partial view of the connector tensioning device shown in FIGS. 1-3.

FIG. 5 is a top view of a modification of the friction bearing curved surface of the sway control device shown in FIGS. 1-3.

FIG. 6 is a front view of the structure shown in FIG. 5 showing mounting clamps.

FIG. 7 is an end view of the structure shown in FIG. 6.

FIG. 8 is a further modification of the sway control device shown in FIGS. 1-7 employing brackets for holding the flexible connector in place on the fixed curved surfaces of the sway control device.

FIG. 9 is a front view of the structure shown in FIG. 8.

FIG. 10 is an end view of the structure shown in FIG. 9.

DESCRIPTION OF THE PREFERRED EMBODIMENT

Figure 11:
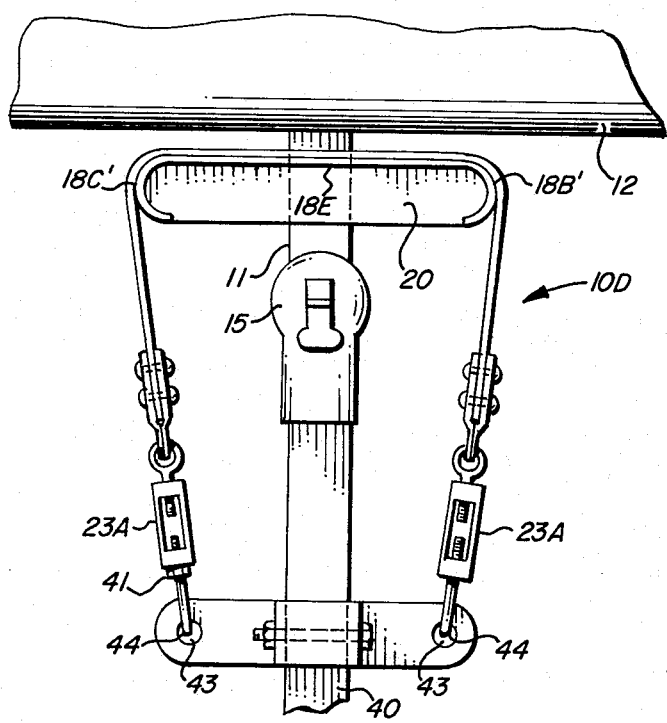
FIG. 11 is a top plan view of a further modification of the sway control device shown in FIGS. 1-10 connected to the hitch bracket of a towing vehicle.

Referring more particularly to the drawings by characters of reference, FIGS. 1-3 disclose a sway control device 10 comprising curved surface 18 and plate 20 hereinafter explained mounted on a conventional towing hitch 11 of a vehicle 12 and having a hitch ball 14 bolted thereto to extend substantially vertically therefrom for receiving a hitching ball socket or coupler 15. Coupler 15 has its rearward extending shank 16 fixed to the forward joined ends of a pair of hitching arms 17 of a trailing vehicle (not shown) by suitable means to form a part of the tongue of a trailer.

The sway control device 10 comprises one or more curved surfaces 18 fixedly mounted on either the towing hitch 11 of the towing vehicle, as shown in FIGS. 1-3, or on the hitching arms 17 or ball socket shank 16 of the towed vehicle, as shown in U.S. Pat. application, Ser. No. 369,263, filed June 12, 1973 by William L. Rendessy.

FIGS. 1-3 illustrate the curved surface 18 comprising a cup shaped metallic strip like configuration formed to curve partly around the hitch ball 14 to provide on its outer circumference friction bearing surfaces 18A, 18B and 18C for a flexible connector 19 herein shown in a belt like configuration.

The curved surface 18 is suitably connected such as by welding on one edge to a flat plate 20 which is secured in turn to the trailer hitch bracket 11. Flat plate 20 is provided with an aperture 21 therethrough, as shown in FIG. 5, for receiving the hitch ball 14.

It should be recognized that the flat plate 20 and curved convex surface 18 may be welded or otherwise secured to the towing hitch 11 or to the flat surface of a step bumper of a truck and sold as a unit or part of the towing hitch bracket or independently thereof as a separate sway control device for attachment to the towing hitch bracket or hitching arms 20 of a towed vehicle.

The flexible connector 19 may comprise a belt or cable formed of suitable material and is available in the marketplace having flexibility anad wear characteristics of tough heavy duty conveyor belting. This connector is placed over the curved surface 18 of the sway control device 10 around its outer circumferential surfaces 18A, 18B and 18C of FIG. 1 and suitably connected at one end by means of a toggle release or clamp 22 to the hitching arms 17 of the towed vehicle and at its second end through a turnbuckle 23 and hook 24 to the other hitching arm 17 of the towed vehicle. Turnbuckle 23 is utilized to adjust the belt or cable as desired.

Turnbuckle 23 comprises a cylindrical housing 25 having a longitudinal slot 26 with an axial threaded opening at one end thereof. The other end of the housing is provided with a pair of juxtapositioned longitudinally extending arms 27 which are arranged to have extending therebetween in bolted connection thereto one end of belt 19, as shown in FIGS. 1 and 2. A single stud 28 is threaded into the axial opening in housing 25 of the turnbuckle which in turn is pivotally attached to hitching arms 17 of the towed vehicle by a simple hook and eye arrangement, as shown. Since only one stud is used, the turnbuckle has to be disconnected to turn.

The toggle release 22 is bolted or riveted to the other end of belt 19 as shown in FIGS. 1 and 2, and connects by means of a hook 29 to an eye bolt 30 which is attached to the hitching arms 17 of the towed vehicle. This toggle release provides a means for quickly applying or releasing tension in belt 19 for tightening or disconnecting the sway control device 10 from the towed or towing vehicle.

As shown in FIG. 4, the toggle release comprises an elongated outer member 31 having an inner member 32 pivotally attached at one end for nesting inside of member 31 with hook 29 pivotally mounted within outer member 31. Outer member 31 is in the form of two parallel flat metal straps joined together by transverse metal pins 33 tightly holding between the straps the end of belt 19.

When inner member 32 of the toggle release is fully nested inside outer member 31, it is in over center position. Reference is made to the patent application referred to above for more detail of a similar toggle release 22 which toggle releases are well known in the art and will not be described in more detail herein for simplicity purposes.

In the nested position and with hook 29 attached to a fixed point on the hitching arm 17, as shown in FIGS. 1 and 2, tension is applied belt 19. Member 32 is kept in the dotted position by hook 29 dropping below pin 34, as shown in FIG. 4, which causes it and member 31 to form an over center locked toggle configuration. To release the toggle end 35A of plate 35 must move hook 29 back over center to open the lock in a manner well known in the art.

To release toggle release 22 in the presence of belt tension, the raised end 35A of plate 35 may be grasped and forced upwardly against the downward force produced by the belt tension. As inner member 32 thus raises in its rotation about pin 34, the effective length of the toggle release assembly increases and relieves the tension. The increased effective length of the toggle release in the fully released position also allows for the disengagement of hook 29 from the ring 30 or other means to which it had been attached.

To prepare sway control device 10 for use, the trailer hitch ball socket is first coupled to the towing vehicle by placing and firmly attaching the coupler over the hitch ball 14. The ends of the belt 19 are attached as shown in FIGS. 1 and 2 through hooks 24 and 29 to the hitching arms 17 of the towed vehicle. The intermediate portion 19A of the belt is then placed around the outer circumferential friction bearing curved surface 18 of the sway control device. Thus, belt 19 makes contact with the curved surface 18 of the sway control device when the toggle release 22 is forced to the nested or closed position after turnbuckle 23 is adjusted to produce the desired tension in belt 19 which now follows a curved path beginning at one end of curved surface 19 and passing around its full curved surface, as shown in FIG. 1 to its point of attachment to turnbuckle 23.

As tension in belt 19 is increased, belt 19 bears against curved surface 18 with increasing pressure and the additional force which must be applied to overcome this friction to produce relative displacement between belt 19 and the outer peripheral bearing surface of the curved surface 18 is correspondingly increased.

As shown in FIGS. 1, 2 and 3, the curved surface 18 comprises an intermediate curved surface 18A terminating in two similar curved ends 18B and 18C. Each curved end is so configured with its relationship to the coupler as to provide the proper turning arrangement so as to keep the belt 19 free from all obstructions when the towed and towing vehicle assume any angular position.

FIGS. 5, 6 and 7 illustrate a modification of the sway control device 10 wherein the sway control device 10A differs from sway control device 10 by the curved surface 18A being replaced by a substantially straight portion 18D. The curved ends 18B and 18C remaining substantially the same. It should be noted that the flat plate 20 of sway control device 10A may be provided with two spaced right angular flanges 36, 36' provided with aligned apertures 37, 37', respectively. Flanges 36, 36' are welded or bolted to flat plate 20 and are so positioned to fit over and bolted through apertures 37, 37' to the towing hitch bracket 11.

FIGS. 8, 9 and 10 illustrate a further modification of the sway control device of FIGS. 1 and 2 which sway control device 10C is modified merely by fixing brackets 38 to selected positions along the curved surface 18 for maintaining belt 19 in position along the curved surface 18. It should be noted that the sway control devices of FIGS. 1-7 operate effectively without the brackets 38 but, if desirable, they can be added to the sway control device at any place along its length and as shown are added for illustrative purposes along the curved ends 18B and 18C. Plate 20C is provided with an aperture 21C for receiving the hitch ball stud and apertures 21D for bolting to a trailer hitch bracket or step bumper of a truck.

FIG. 11 illustrates a further modification of the sway control devices shown in FIGS. 1–10 wherein the sway control device 10D varies from sway control devices 10 and 10A of FIGS. 1, 2 and 5–7 by utilizing a straight surface 18E for interconnecting curved ends 18B' and 18C'. This surface arrangement may be fixed to, as by welding, flat plate 20 of the sway control device. This sway control device may be welded directly to the hitch bracket 11 of the towing vehicle as shown.

It should be noted that in this modification two turnbuckles 23A may be employed one on each end of belt 19 for tightening the belt around the curved ends 18B' and 18C' of the sway control device with the free ends of the turnbuckles connected to single tongue structure 40 of a towed vehicle. As noted, a tightening lock nut 41 is used with one of the turnbuckles to lock it in place.

Figure 12:
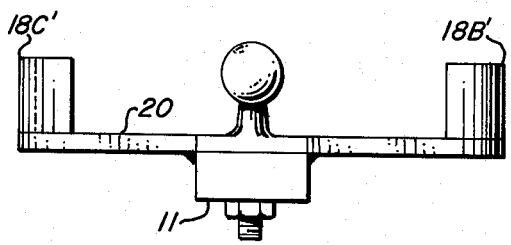
FIG. 12 is a front view of a further modification of the sway control device shown in FIG. 11 omitting the middle section of the curved surface mounted on the hitch bracket of the towing vehicle.

FIG. 12 illustrates a modification of the sway control devices shown where the curved surfaces 18B' and 18C' of FIG. 11 are fixed to plate 20 without the interconnecting surface 18E.

Figure 13:
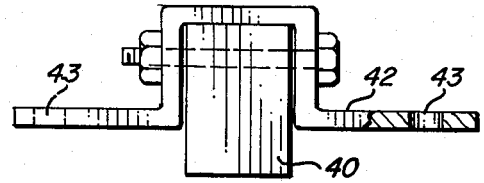
FIG. 13 is a cross-sectional view of an adaptor shown in FIG. 11 for connecting the sway control to a single tongue trailer.

FIG. 13 illustrates one form of adaptor 42 for clamping over the tongue 40 of the towed vehicle as shown in FIG. 11. This adaptor clamped to the tongue 40 of the towed vehicle is provided with two apertures 43 for receiving the hook ends 44 of the turnbuckles 23A.

Figure 14:
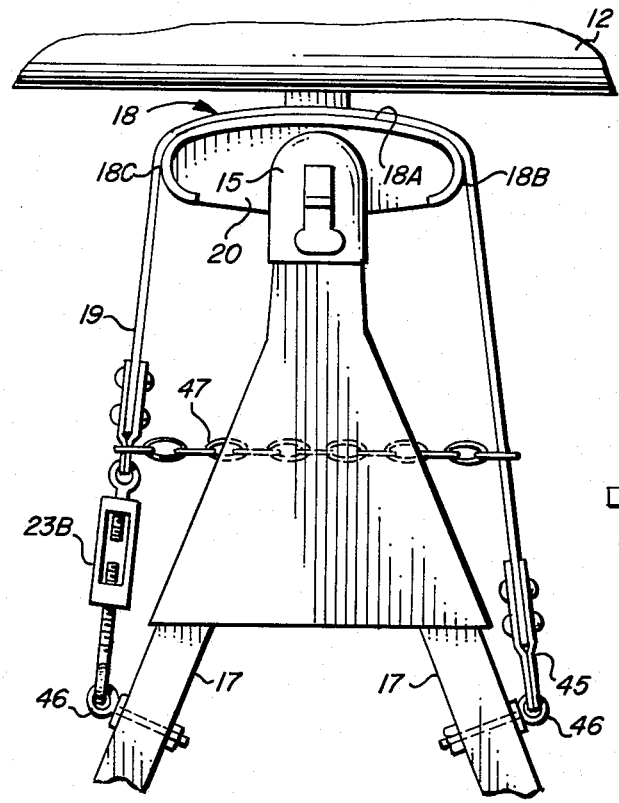
FIG. 14 is a still further modification of the sway control devices shown in FIGS. 1-13 secured to the trailer hitch of a towing vehicle.

FIG. 14 shows a further modifications of the sway control device illustrated in FIGS. 1 and 2 showing a simple hardware arrangement wherein a simple eye bolt 46 is connected at one end of belt 19 with a turnbuckle arrangement 23B used at the other end for controlling the tension of belt 19 around the curved surface 18A and ends 18B and 18C of the sway control device.

A safety chain 47 may be interconnected with connector 19 as shown in FIG. 14 to keep the tongue of the trailer from dropping to the road bed if the coupler 15 becomes disconnected from the towing vehicle.

It should be noted in FIGS. 12 and 14 that plate 20 increases the width and area of the hitch bracket considerably over the conventional hitch brackets. In the event of breakaway of the coupler from the hitch ball during towing, the inner surfaces of curved surfaces 18B and 18C and 18B' and 18C' will limit lateral movement of the coupler. The straight or curved surfaces 18E and 18A, respectively, will limit forward movement of the coupler. Connector 19 limits rearward movement of the coupler and plate 20 prevents the coupler from dropping to the roadway. Thus, the improved sway control devices disclosed also provide a safety function which heretofore was not possible with the prior art devices.

Figure 15:
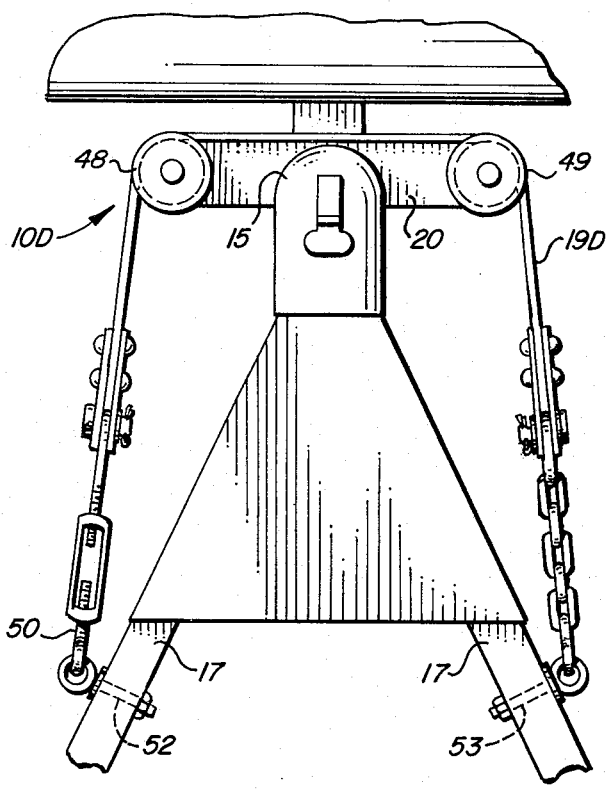
FIG. 15 is a further modification of the sway control devices shown in FIGS. 1-14 wherein the curved surfaces are replaced with rotors.

FIG. 15 discloses a further modification of the sway control devices shown in FIGS. 1–14 and particularly FIG. 11 wherein sway control device 10D comprises rotors 48 and 49 in place of the curved surfaces 18B' and 18C' mounted on plate 20D. Connector 19D is placed over the rotors and connected with hooks 50 and 51 to eye bolts 52, 53, as shown, and operates in substantially the same manner as the structure shown in FIG. 1.

Figure 17:
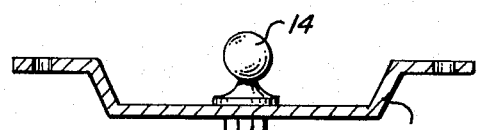
FIG. 17 is a partial end view of the hitch bracket shown in FIG. 16.
Figure 16:
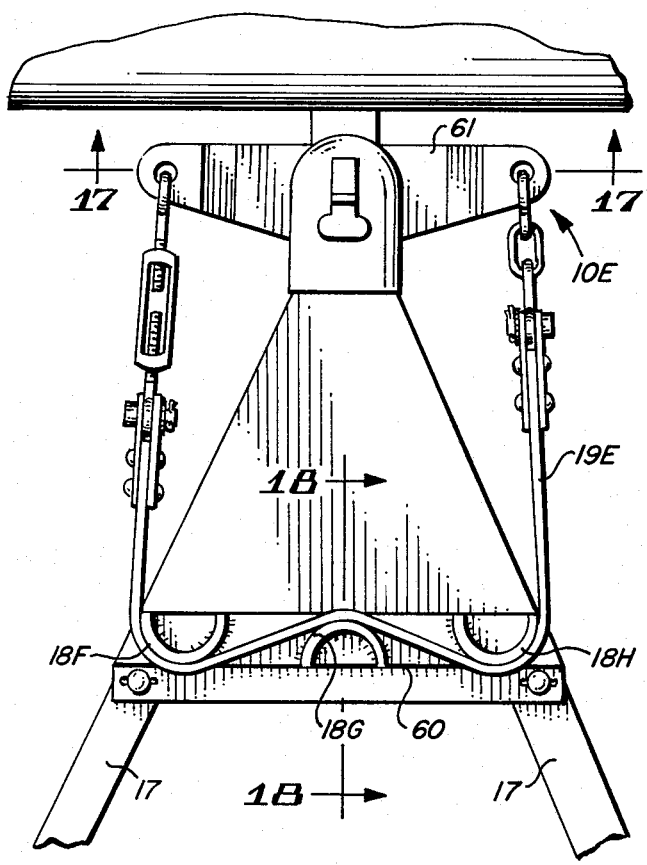
FIG. 16 is a still further modification of the sway control devices shown in FIGS. 1-15 wherein a plurality of curved surfaces are mounted on the tongue of the towed vehicle.
Figure 18:
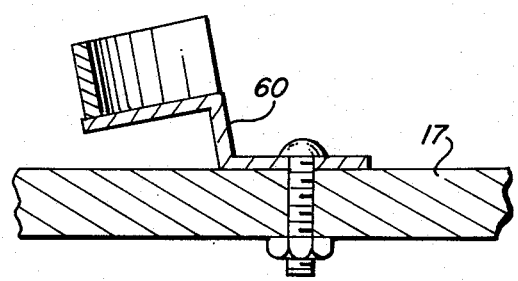
FIG. 18 is a partial end view of the bracket for mounting the curved friction damping surfaces on the tongue of the trailer.

FIGS. 16–18 illustrate a still further modification of sway control devices shown in FIGS. 1–15 wherein device 10E comprises curved surfaces 18F, 18G and 18H mounted on a bracket 60 attached to the tongue of a trailer. The flexible connector 19E is placed in a serpentine manner around curved surfaces 18F, 18G and 18H as shown with its free ends detachably mounted to a hitch bracket 61. The hitch bracket supports the hitch ball 14 as shown in FIG. 17.

It should be recognized that the use of the disclosed sway control devices eliminates the need for the usual safety chains on towed vehicles since belt 19 serves that purpose and is at least an equivalent in strength. If at all times is around and interconnected with the towed vehicle when taut and thus serves the safety chain purpose.

Although but a few embodiments of the invention have been illustrated and described, it will be apparent to those skilled in the art that various additional changes and modifications may be made therein without departing from the spirit of the invention or from the scope of the appended claims.

What is claimed is:

1. A sway control device adapted for mounting onto the rear portion of a towing vehicle provided with a pivotal hitch connection connectable to a coupler provided for the tongue of a trailer comprising in combination:
   a curved guiding surface adapted to be secured to said towing vehicle adjacent to said pivotal hitch connection comprising a convex configuration at least partially surrounding the pivotal hitch connection of the towing vehicle,
   said curved guiding surface containing the coupler to limit its forward and lateral movement and having curved portions laterally positioned an equal distance on each side of said pivotal hitch connection,
   a flexible connector comprising first and second ends and an intermediate portion,
   said first and second ends adaptedly securable to opposite sides of the tongue of the trailer,
   said intermediate portion adapted to cooperatively engage the external surface of said curved guiding surface in a taut manner to cause frictional damping thereon and limit movement of the coupler from the area of said pivotal hitch connection in the event said coupler accidentally becomes disengaged from its pivotal hitch connection while the trailer is being towed, and
   means to tighten and loosen the perimeter of said connector encompassing said curved guiding surfaces.

2. The sway control device set forth in claim 1 wherein:
   said curved guiding surface is a non-rotatable structure.

3. The sway control device set forth in claim 1 wherein:
   said curved surface is arranged laterally to the axial alignment of the pivotal hitch connection and the coupler when connected.

4. The sway control device set forth in claim 1 wherein:
   said curved surface extends vertically over the pivotal hitch connection of the towing vehicle.

5. The sway control device set forth in claim 1 wherein:
   said curved guiding surface comprises a convex configuration having ends which turn toward the coupler of a connected trailer.

6. The sway control device set forth in claim 1 wherein:
   at least the part of said flexible connector engaging said curved surface comprises a belt.

7. The sway control device set forth in claim 6 wherein:
   said belt is substantially equal in tensile strength to chain linkages normally employed as safety chains on trailer towing vehicles.

8. The sway control device set forth in claim 6 wherein:
   said flexible connector comprises at least one turnbuckle.

9. The sway control device set forth in claim 1 in further combination with:
   a safety chain arranged to extend underneath the tongue of the trailer and having its ends connected to opposite points on said flexible connector.

10. The sway control device set forth in claim 1 wherein:
    said curved guiding surface is provided with means for maintaining the flexible connector on said surface.

11. The sway control device set forth in claim 10 wherein:
    said means comprises at least one bracket for limiting the movement laterally of the flexible connector along the length of said curved guiding surface.

12. The sway control device set forth in claim 11 wherein:
    two brackets are provided one on each end of said curved guiding surface.

13. The sway control device set forth in claim 1 wherein:
    said curved portions comprise a pair of rotatable structures laterally positioned an equal distance on each side of said pivotal hitch connection.

14. A sway control device for mounting on the rear portion of a towing vehicle towing a trailer having a tongue and hitch coupler comprising in combination:
    a hitch bracket adapted to be secured to the rear portion of said towing vehicle and extending rearward therefrom,
    said hitch bracket adapted to receive a trailer mounted hitch coupler for pivotal connection therewith,
    at least one non-rotatable curved guiding surface secured to said hitch bracket adjacent said pivotal connection,
    said surface extending laterally of the longitudinal axis of the said hitch bracket and comprising a convex configuration at least partially surrounding the pivotal connection of the hitch coupler,
    the outer portion of the convex configuration serving as a friction guiding surface for a flexible operating means and the inner portion facing the hitch coupler and partially surrounding it,
    a flexible operating means having first and second ends and a middle portion,
    said ends each being provided with attachment means for engaging opposite sides of the tongue of the trailer,
    said middle portion of said operating means cooperatively engaging the friction guiding surface of said curved guiding surface in a taut manner to induce frictional damping movement of said operating means thereon, and
    means for tightening and loosening the perimeter of said operating means encompassing said arcuate surfaces and said attachment means.

15. The sway control device set forth in claim 14 wherein:
said curved surface comprises two separated curved portions positioned on said hitch bracket an equal distance on each side of the pivotal connection with said coupler.

16. The sway control device set forth in claim 14 in further combination with:
a trailer hitch ball mounted on said hitch bracket to form said pivotal connection, and
clamp means forming a part of said hitch bracket for attachment to the rear portion of said towing vehicle.

17. The sway control device set forth in claim 14 wherein:
said curved guiding surface is provided with one or more brackets for limiting the lateral movement of said flexible operating means.

18. A sway control device demountably connectable between a towing vehicle and a vehicle being towed comprising in combination:
a flexible operating means comprising first and second ends and an intermediate portion,
a fixedly mountable curved guiding surface frictionally engaging said intermediate portion of said operating means,
said curved guiding surface comprising a pair of spaced apart convex curved configurations,
said ends of said operating means being secured to one of said vehicles and said intermediate portion of said operating means being positioned over said convex curved configurations in a taut manner to induce frictional damping between said operating means and said guiding surface, and
dual purpose means for tightening the perimeter of said operating means to operationally engage said guiding surface and to loosen said operating means for disconnection between said vehicles.

19. The sway control device set forth in claim 18 in further combination with:
means mounted on said convex curved surface configuration for limiting lateral movement of said operating means when moving longitudinally thereof.

20. A trailer having a tongue with opposite sides adapted to receive opposite ends of a flexible connector having an intermediate portion adjustably connectable to the rear portion of a towing vehicle comprising in combination:
a hitch bracket having opposite ends,
one of said ends adapted to be secured onto said rear portion of said towing vehicle,
the other of said ends adapted for mounting a pivotal connection connectable to a coupler secured to said tongue,
a vertically positioned convex arcuate guiding surface secured to said hitch bracket adjacent said pivotal connection,
said surface at least partially surrounding the pivotal connection and containing the connection to limit its forward and lateral movement,
the external perimeter of said arcuate surfaces adapted to receive said intermediate portion of said flexible connector in a manner to induce frictional damping thereon and to restrict movement of said coupler in event said coupler becomes accidently disconnected when towing a trailer.

21. A sway control device adapted for mounting onto the rear portion of a towing vehicle provided with a pivotal hitch connection connectable to a coupler provided for the tongue of a trailer comprising in combination:
a curved guiding surface comprising two spaced apart curved arcuate configurations each having a common end in alignment with the other and their other ends curved toward the tongue of the towed trailer,
said curved guiding surface adapted to be secured to said towing vehicle adjacent to said pivotal hitch connection,
said curved arcuate configurations being laterally positioned an equal distance one on each side of said pivotal hitch connection,
a flexible connector comprising first and second ends and an intermediate portion,
said first and second ends adaptedly securable to opposite sides of the tongue of the trailer,
said intermediate portions adapted to cooperatively engage the external surface of said curved guiding surface in a taut manner to cause frictional damping thereon and limit movement of the coupler from the area of said pivotal hitch connection in the event said coupler accidentally becomes disengaged from its pivotal hitch connection while the trailer is being towed, and
means to tighten and loosen the perimeter of said connector encompassing said curved guiding surface.

22. The sway control device set forth in claim 21, wherein:
said means comprises a toggle release lever.

23. A dual purpose sway control device adapted to be secured adjacent the hitch ball of a towing vehicle interconnected to the tongue mounted coupler of a trailer comprising in combination:
an arcuate structure comprising an outer portion utilized as a friction guiding surface and an inner portion facing said coupler and partially surrounding the hitch ball and coupler when connected to the towing vehicle,
a flexible connector comprising left and right end portions and an intermediate portion,
said left and right portions provided with attachment means to corresponding left and right sides of the tongue of the trailer,
said intermediate portion adapted to conform to and cooperatively engage said guiding surface in a biasing manner to cause frictional damping thereon,
the coupler when connected to the hitch ball providing a first means of connection between the towing vehicle and the trailer,
said end portions of said connector when connected to said tongue and said intermediate portion when engaging said guiding surface comprising a second means of connection between the towing vehicle and the trailer,
said connector when drawn taut providing frictional damped movement of said connector along the length of said guiding surface and confining movement of said coupler within the area of said inner portion of said structure in event of accidental disengagement of said coupler from said hitch ball while said trailer is being towed, and
means to cause tightening and loosening of said connector.

* * * * *